United States Patent [19]
Ogata

[11] Patent Number: 6,101,337
[45] Date of Patent: Aug. 8, 2000

[54] OPTICAL SYSTEM HAVING FIBER OPTICAL PLATE

[75] Inventor: Yasuzi Ogata, Akiruno, Japan

[73] Assignee: Olympus Optical Co., Ltd., Tokyo, Japan

[21] Appl. No.: 09/274,105

[22] Filed: Mar. 23, 1999

[30] Foreign Application Priority Data

Mar. 25, 1998 [JP] Japan .................................. 10-077566

[51] Int. Cl.[7] .......................... G03B 17/00; G03B 17/18; G02B 6/04; H04N 5/225
[52] U.S. Cl. ......................... 396/267; 396/286; 348/340; 348/341; 348/359; 385/120
[58] Field of Search .................... 396/267, 268, 396/378, 385, 386, 373; 348/340, 341, 359; 359/341; 385/120

[56] References Cited

U.S. PATENT DOCUMENTS

| 5,309,241 | 5/1994 | Hoagland | 348/359 X |
| 5,678,080 | 10/1997 | Miyamoto | 396/267 |

*Primary Examiner*—W. B. Perkey
*Attorney, Agent, or Firm*—Pillsbury Madison & Sutro LLP

[57] ABSTRACT

An optical system includes an photographic lens, a fiber optical plate, and an image pickup member. The photographic lens forms the first image in the vicinity of the entrance end surface of the fiber optical plate, and after the first image is transmitted through the fiber optical plate, the second image is formed in the vicinity of the exit end surface of the fiber optical plate. The image pickup member is disposed to coincide in size with the second image. The first image is demagnified to a desired image size determined by the image pickup member and thereby the photographic lens is downsized.

6 Claims, 4 Drawing Sheets

OPTICAL SYSTEM HAVING FIBER OPTICAL PLATE

BACKGROUND OF THE INVENTION

1. Field of the Invention

This invention relates to an optical system for use in a silver halide film camera and a digital still camera, and in particular, to an optical system having a fiber optical plate.

2. Description of Related Art

An optical element called a fiber optical plate (hereinafter abbreviated to FOP) has been known as an image transmitting element using an optical fiber. This optical element is the same in principle as an image guide and has a compact design such that its length can be as short as several tens of millimeters. Such FOPs are of two types; one, in which an image formed on the entrance surface of the optical element is transmitted to the exit surface thereof with unity (1×) magnification, and the other, in which a single fiber constituting the FOP is shaped into a taper-like form to magnify the image formed on the entrance surface while transmitting the image to the exit surface. In particular, a taper type FOP of the latter has severalfold magnification and, in contrast with the case of a conventional technique of changing an image magnification by a refractive function of a lens, can be materially reduced in size.

In recent years, digital cameras have become more popular. To meet the needs of this industry, there is competition to achieve higher pixel density and smaller image pickup devices. In order to make sure of the photographing area of the digital camera, a liquid crystal display or an optical finder is utilized. The optical finder has the benefit of requiring less battery than the liquid crystal display. In most cases, however, the optical finder is constructed to be independent of a photographic lens, and thus the production of parallax is unavoidable in the optical finder. This problem becomes more severe as an object distance is diminished or as a variable magnification ratio is increased.

Consequently, a camera using a TTL type optical finder is proposed. This optical finder is known as a Keplerian real image mode finder, such as that used in a silver halide film camera, or a relay real image mode finder. In either case, if an imager is downsized, the intermediate image of a finder system will diminish in size. However, since a finder magnification and a field angle which an observer desires remain unchanged, magnification for magnifying the intermediate image must be increased. In this way, the power load of an eyepiece is increased, resulting in oversizing of the eyepiece and a rise in cost due to the necessary aberration and an increase of the number of lenses.

In an optical system with a film of relatively large size as in the silver halide film camera, an image to be photographed and an intermediate image observed through a finder are enlarged, and thus a photographing optical system and a finder optical system become oversized, which is unfavorable.

SUMMARY OF THE INVENTION

It is, therefore, an object of the present invention to provide a photographing optical system which is small in size, but is capable of recording a sufficiently large photographic image in an imager or on a silver halide film.

It is another object of the present invention to provide a finder optical system in which an intermediate image is demagnified and thereby compactness can be achieved.

It is still another object of the present invention to provide a finder optical system in which an intermediate image is magnified and thereby an eyepiece can be constructed with a small number of lenses.

It is a further object of the present invention to provide a finder optical system in which a part of the visual field of a finder can be magnified for observation.

According to one aspect of the present invention, the optical system is provided with a photographic lens, an FOP, and an image pickup member. The FOP has an entrance end surface and an exit end surface which are different in size and magnifier an image.

According to another aspect of the present invention, the optical system is provided with an FOP. The FOP has an entrance end surface and an exit end surface which are different in size, demagnifies an image, and is placed on the image side of a position where a first intermediate image is formed.

According to still another object of the present invention, the optical system is provided with an FOP. The FOP has an entrance end surface and an exit end surface which are different in size, magnifies an image, and is placed on the image side of a position where a first intermediate image is formed.

According to a further object of the present invention, the optical system is provided with a first FOP having an entrance end surface and an exit end surface which are different in size and demagnifies an image and a second FOP having an entrance end surface and an exit end surface which are identical in size and transmits an image with unity magnification. The first and second FOPs are located to be replaceable on the image side of a position where a first intermediate image is formed.

These and other objects as well as the features and advantages of the present invention will become apparent from the following detailed description of the preferred embodiments when taken in conjunction with the accompanying drawings.

DETAILED DESCRIPTION OF THE PREFERRED EMBODIMENTS

In accordance with the drawings, the embodiments of the present invention will be described below.

First embodiment

Figure 1:
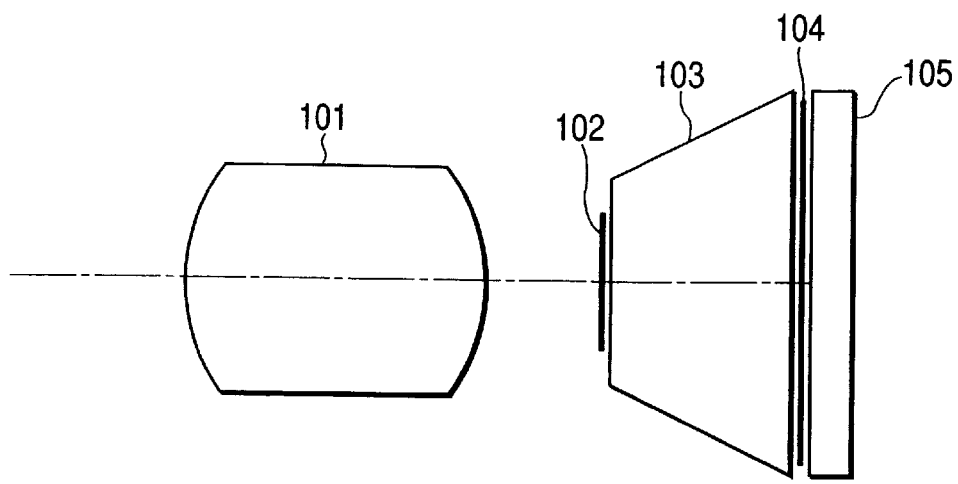
FIG. 1 is a sectional view showing the optical system of a first embodiment in the present invention.

FIG. 1 shows the first embodiment in which the optical system of the present invention is applied to the photographic lens of a digital camera. In this figure, reference numeral 101 represents a photographic lens; 102, a first intermediate image formed by the photographic lens 101; 103, an FOP placed on the image side of the first intermediate image, having an entrance end surface and an exit end surface which are different in size and producing, for example, a twofold magnification; 104, a second intermediate image magnified twofold and formed by the FOP 103; and 105, an imager (image pickup member) consisting of, for example, a ½ inch CCD, for receiving the second intermediate image 104. Actually, in this case, the FOP 103 is located so that the position where the first intermediate image 102 is formed coincides with the position of the entrance end surface of the FOP 103, and the second intermediate image 104 is formed on the exit end surface of the FOP 103. Thus, the light-receiving surface of the imager 105 is placed in close contact with the exit end surface of the FOP 103, or the imager 105 and the FOP 103 are integrally constructed. In this way, according to the first embodiment, an image formed by the photographic lens 101 is magnified twofold by the FOP 103, and the photographic lens 101 may have a size that would conventionally be used with a ¼ inch imager thus, the photographic lens 101, can be downsized as compared with a conventional case.

Second embodiment

Figure 2:
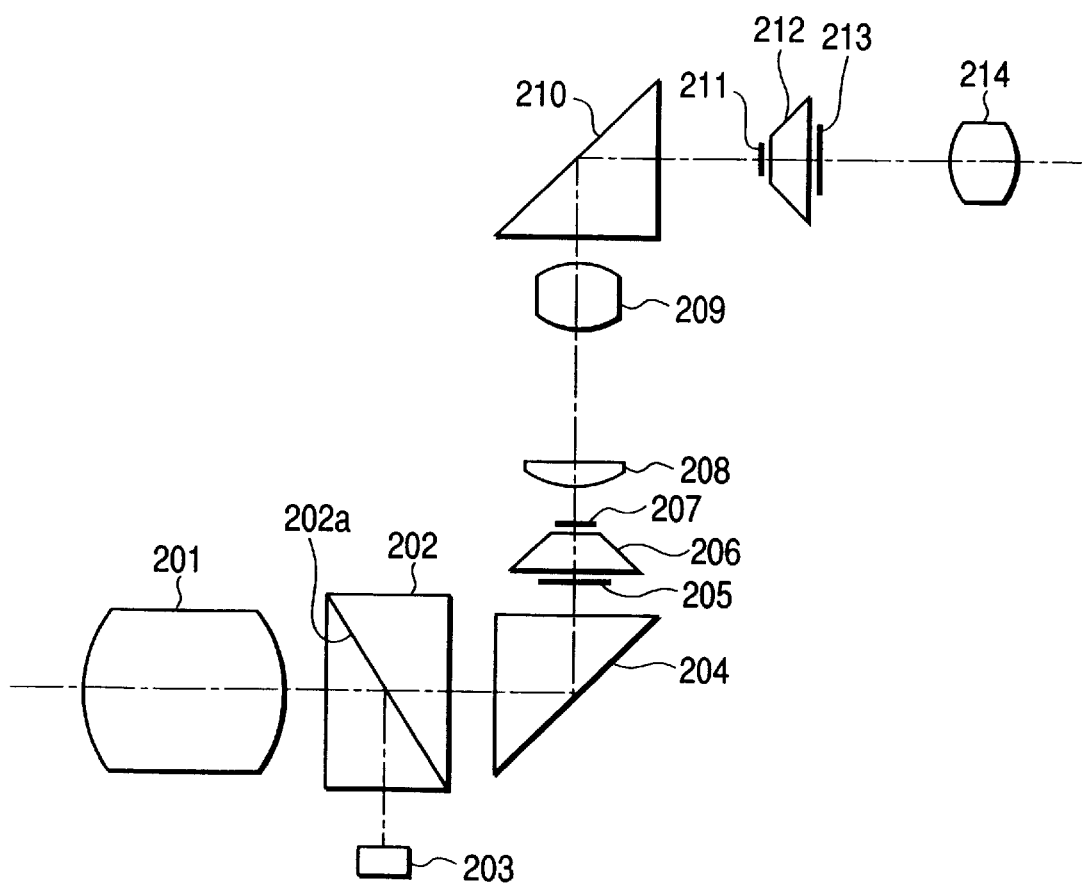
FIG. 2 is a sectional view showing the optical system of a second embodiment in the present invention.

FIG. 2 shows the second embodiment in which the optical system of the present invention is applied to a TTL type relay real image mode finder for digital cameras. In this figure, reference numeral 201 denotes a photographic lens; 202, a prism having,a half mirror 202a; 203, an imager for receiving an object image formed by the photographing lens 201; 204, a prism for bending the optical axis of the optical system at right angles; 205, a first intermediate image; 206, an FOP having an entrance end surface and an exit end surface which are different in size and which demagnifies the image; 207, a second intermediate image; 208, a field lens; 209, a relay lens; 210, a prism for bending the optical axis at right angles; 211, a third intermediate image; 212, an FOP having an entrance end surface and an exit end surface which are different in size and which magnifies the image; 213, a fourth intermediate image; and 214, an eyepiece. Actually, in this case, the FOP 206 is placed so that the first intermediate image 205 is formed on the entrance end surface thereof, while the FOP 212 is placed so that the third intermediate image 211 is formed on the entrance end surface thereof.

Since the second embodiment is constructed as mentioned above, a light beam passing through the photographic lens 201 enters the prism 202 and is split into two beams directed toward an image pickup system and a finder system. Specifically, the light beam reflected by the half mirror 202a is imaged on the imager 203, and an image thus obtained is stored as an object image in the imager 203. On the other hand, the light beam transmitted through the half mirror 202a is deflected at right angles by the reflecting surface of the prism 204 to form the first intermediate image 205 on the entrance end surface of the FOP 206. The first intermediate image 205 is demagnified by the FOP 206 so that the second intermediate, image 207 is formed as its demagnified image on the exit end surface of the FOP 206. This Image, after being pupil-transmitted by the field lens 208, is relayed by the relay lens 209 and re-formed as the third intermediate image 211 through the prism 210 on the entrance end surface of the FOP 212. The third intermediate image 211 is magnified by the FOP 212 so that the fourth intermediate image 213 is formed as its magnified image on the exit end surface of the FOP 212. In this way, the fourth intermediate image 213 is observed through the eyepiece 214.

In the second embodiment, the first intermediate image 205 is demagnified by the FOP 206 so that the second intermediate image 207 is formed as its demagnified image, and thus a relay system can be designed to be much more compacter than in the case where the first intermediate image 205 is relayed directly. In particular, since the relay lens 209 is usually constructed with about three lenses, the fact that the first intermediate image 205 is demagnified to the second intermediate image 207 brings about a significant effect on a compact design of the relay system. If, on the other hand, an attempt is made to observe the third intermediate image 211 without using the FOP 212, the power of the eyepiece 214 must be enhanced. This is undesirable for optical performance. Specifically, the enhancement of the power not only makes it difficult to achieve favorable correction for aberration, but also causes an increase of the number of lenses constituting the eyepiece, resulting in oversizing of the eyepiece and a rise in cost. If the eyepiece Is constructed with an extremely small number of lenses, aberration will not be completely corrected and the view of the visual field will be impaired.

Third embodiment

Figure 3:
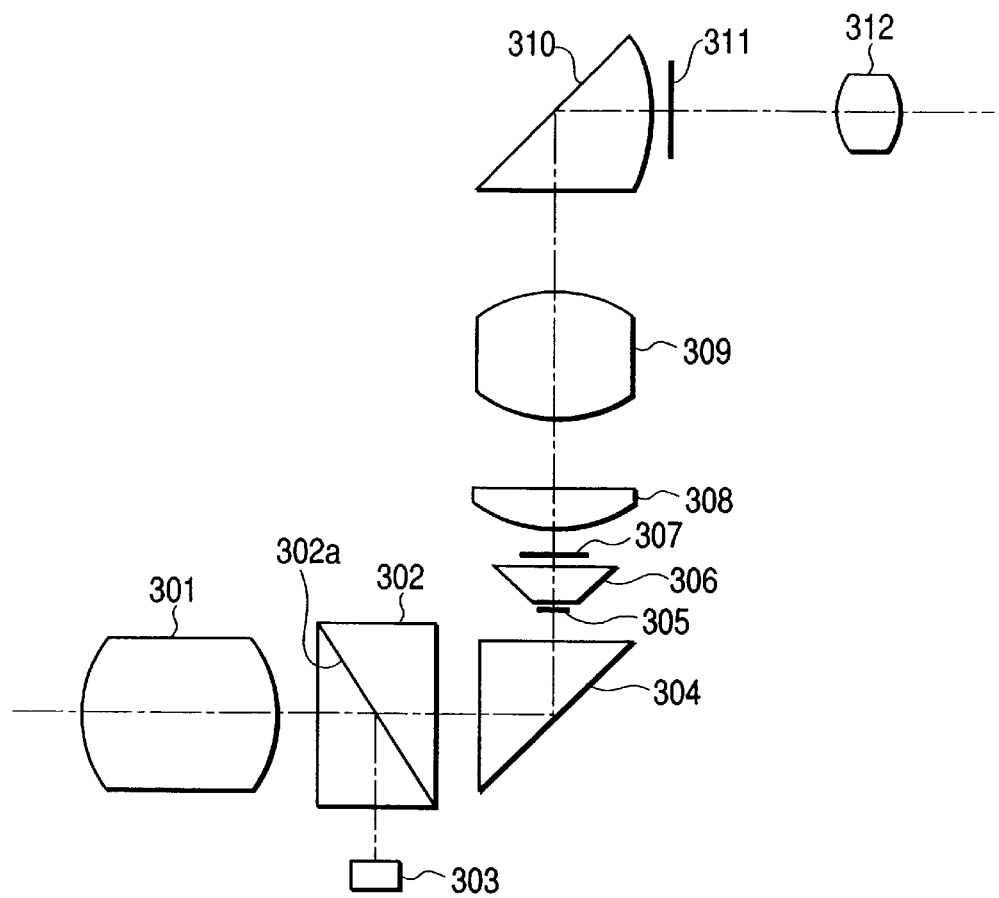
FIG. 3 is a sectional view showing the optical system of a third embodiment in the present invention.

FIG. 3 shows the third embodiment in which the optical system of the present invention is applied to a TTL type relay real image mode finder for digital cameras. In this figure, reference numeral 301 denotes a photographic lens; 302, a prism having a half mirror 302a; 303, an imager for receiving an object image formed by the photographing lens 301; 304, a prism for bending the optical axis of the optical system at right angles; 305, a first intermediate image; 306, an FOP having an entrance end surface and an exit end surface which are different in size and which magnifies the image; 307, a second intermediate image; 308, a field lens; 309, a relay lens; 310, a prism for bending the optical axis at right angles; 311, a third intermediate image; and 312, an eyepiece. In this case also, the FOP 306 is placed so that the first intermediate image 305 is formed on the entrance end surface thereof.

Since the third embodiment is constructed as mentioned above, a light beam passing through the photographic lens 301 enters the prism 302 and is split into two beams directed toward an image pickup system and a finder system. Specifically, the light beam reflected by the half mirror 302a is imaged on the imager 303 and an image thus obtained is stored as an object image in the imager 303. On the other hand, the light beam transmitted through the half mirror 302a is deflected at right angles by the reflecting surface of the prism 304 to form the first intermediate image 305 on the, entrance end surface of the FOP 306. The first intermediate image 305 is magnified by the FOP 306 so that the second intermediate image 307 is formed as its magnified image on the exit end surface of the FOP 306. This image, after being pupil-transmitted by the field lens 308, is relayed by the relay lens 309 and re-formed as the third intermediate image 311 after the optical axis is bent at right angles by the prism 310. In this way, the third intermediate image 311 is observed through the eyepiece 312.

As will be obvious from the above description, the third embodiment, in contrast with the second embodiment, is designed so that the imager 303 is downsized and the first intermediate image 305 is also small in size. The first intermediate image 305 of this small size is thus magnified by the FOP 306 so that power loads of the relay lens 309 and the eyepiece 312 are reduced.

Fourth embodiment

Figure 4:
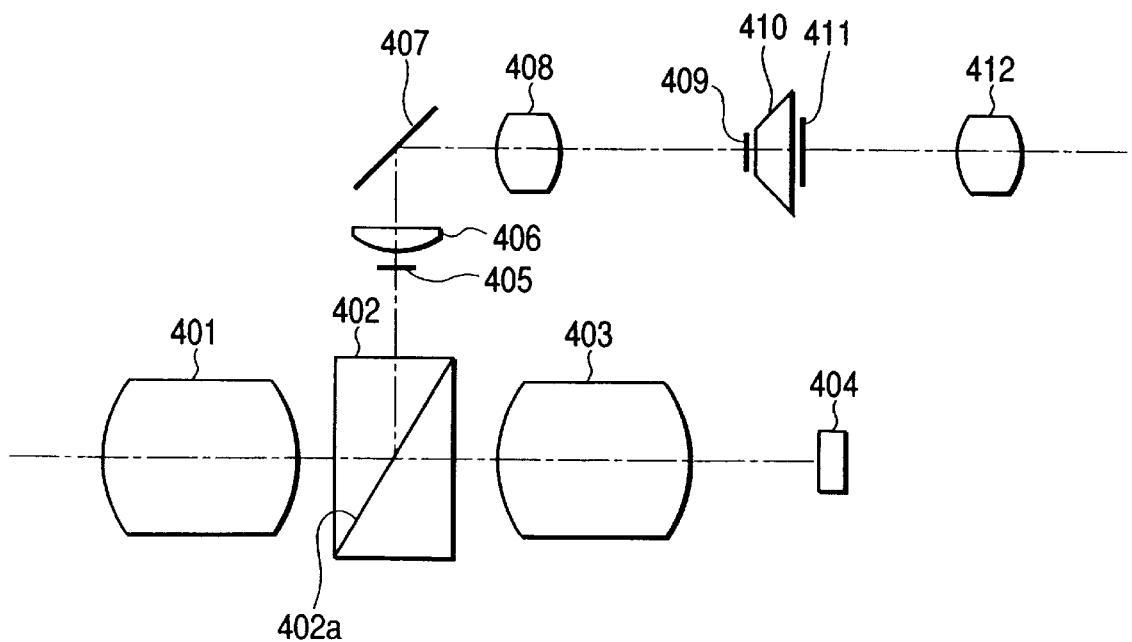
FIG. 4 is a sectional view showing the optical system of a fourth embodiment in the present invention.

FIG. 4 shows the fourth embodiment in which the optical system of the present invention is applied to a TTL type relay real image mode finder for digital cameras. In this figure, reference numeral 401 represents a front lens unit of a photographic lens; 402, a prism having a half mirror 402a;

403, a rear lens unit of the photographic lens; 404, an imager for receiving an object image; 405, a first intermediate image; 406, a field lens; 407, a mirror for bending the optical axis of the optical system; 408, a relay lens; 409, a second intermediate image; 410, an FOP having an entrance end surface and an exit end surface which are different in size and which magnifies the image; 411, a third intermediate image; and 412, an eyepiece. As will be obvious from the above explanation, the fourth embodiment is such that a finder light beam is taken out between the lens units of the photographic lens.

Since the fourth embodiment is constructed as mentioned above, a light beam for the imager, after passing through the front lens unit 401 of the photographic lens, the prism 402, and the rear lens unit 403 of the photographic lens, is imaged on the imager 404 and an image thus obtained is stored as an object image therein. On the other hand, a light beam for the finder, after passing through the front lens unit 401 and entering the prism 402, is deflected by the half mirror 402a to form the first intermediate image 405. The first intermediate image 405 passes through the field lens 406, is reflected by the mirror 407, and is relayed by the relay lens 408. This image is re-formed as the second intermediate image 409 on the entrance end surface of the FOP 410. The second intermediate image 409 is magnified by the FOP 410 so that the third intermediate image 411 is formed as its magnified image on the exit end surface of the FOP 410. The third intermediate image 411 is observed through the eyepiece 412.

According to the fourth embodiment thus constructed, the first intermediate image 405 is relatively small and hence the relay optical system can be downsized. Furthermore, since the third intermediate image 411 magnified by the FOP 410 is to be observed, the eyepiece 412 is easily corrected for aberration and this affords a good view of the visual field of the finder.

Fifth embodiment

Figure 5:
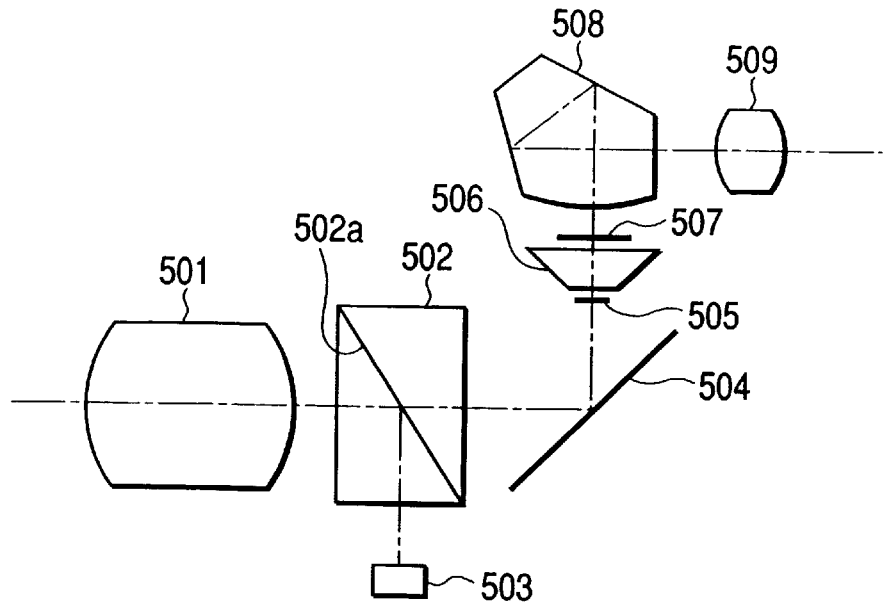
FIG. 5 is a sectional view showing the optical system of a fifth embodiment in the present invention.

FIG. 5 shows the fifth embodiment in which the optical system of the present invention is applied to a TTL type Keplerian real image mode finder for digital cameras. In this figure, reference numeral 501 represents a photographic lens; 502, a prism having a half mirror 502a; 503, an imager for receiving an object image; 504, a mirror for bending the optical axis of the optical system; 505, a first intermediate image; 506, an FOP having an entrance end surface and an exit end surface which are different in size and retaining the function of magnifying the image; 507, a second intermediate image; 508, a pentagonal roof prism; and 509, an eyepiece.

Since the fifth embodiment is constructed as mentioned above, a light beam passing through the photographic lens 501 is incident on the prism 502 and is split into two beams directed toward the image pickup system and the finder system. The light beam reflected by the half mirror 502a is imaged on the imager 503. On the other hand, the light beam transmitted through the half mirror 502a is reflected by the mirror 504 to form the first intermediate image 505 on the entrance end surface of the FOP 506. The first intermediate image 505 is magnified by the FOP 506 so that the second intermediate image 507 is formed as its magnified image on the exit end surface of the FOP 506. The second intermediate image 507, after being reflected three times by the pentagonal roof prism, emerges therefrom and is observed through the eyepiece 509.

In the fifth embodiment, as mentioned above, the first intermediate image 505 is made small in accordance with compactness of the imager 503 and thus, under this situation, it is difficult to correct aberration for the eyepiece 509. As such, the first intermediate image 505 is magnified by the FOP 506 so that the second intermediate image 507 formed as its magnified image is observed, and thereby the eyepiece 509 is favorably corrected for aberration. Also, although the mirror 504 is fixed in the fifth embodiment, it can be replaced with an instant-return mirror used in a single-lens reflex camera for silver halide films. In this case, the prism 502 is eliminated and the imager 503 is placed behind the mirror 504.

Sixth embodiment

Figure 6:
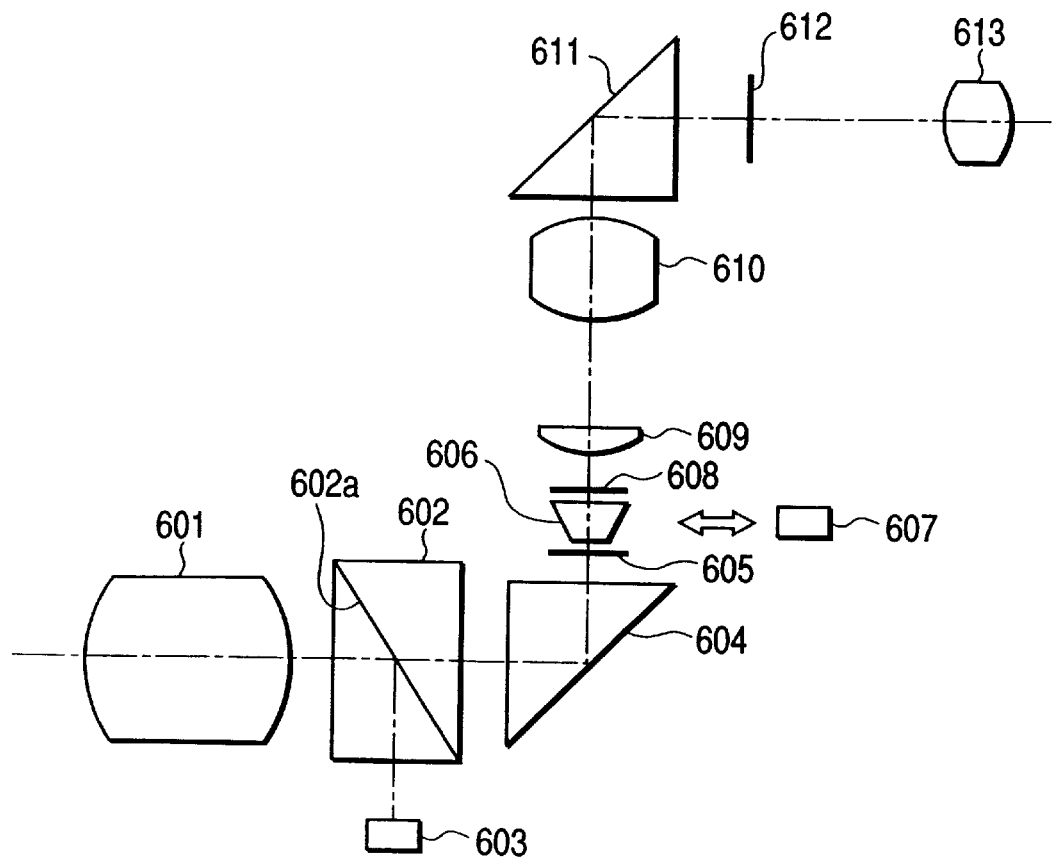
FIG. 6 is a sectional view showing the optical system of a sixth embodiment in the present invention.

FIG. 6 shows the sixth embodiment in which the optical system of the present invention is applied to a TTL type relay real image mode finder for digital cameras. In this figure, reference numeral 601 designates a photographic lens; 602, a light-splitting prism having a half mirror 602a; 603, an imager for receiving an object image formed by the photographic lens 601; 604, a prism for bending the optical axis of the optical system at right angles; 605, a first intermediate image; 606, an FOP having an entrance end surface and an exit end surface which are different in size and which magnifies the image; 607, an FOP provided to be movable in and out of the optical path, alternately with the FOP 606, having an entrance end surface and an exit end surface which are identical in size and which transmits the image with unity magnification; 608, a second intermediate image; 609, a field lens; 610, a relay lens; 611, a prism for bending the optical axis at right angles; 612, a third intermediate image; and 613, an eyepiece. In this case, the FOP 606 or 607 is placed so that when it is introduced into the optical path, the first intermediate image 605 is formed on the entrance end surface thereof.

The sixth embodiment is constructed as mentioned above, and thus when the FOP 607 which transmits the image with unity magnification is introduced into the optical path, the entire visual field of the finder can be observed as mentioned already. On the other hand, when the FOP 606 which magnifies the image, as shown in the figure, is inserted in the optical path in replacement of the FOP 607, a part of the visual field, for example, the middle portion thereof can be magnified and observed, so that focusing is facilitated. That is, the sixth embodiment provides an additional function for magnifying and observing a part of the visual field of the finder by replacing the FOP 607 with the FOP 606.

Seventh embodiment

Figure 7:
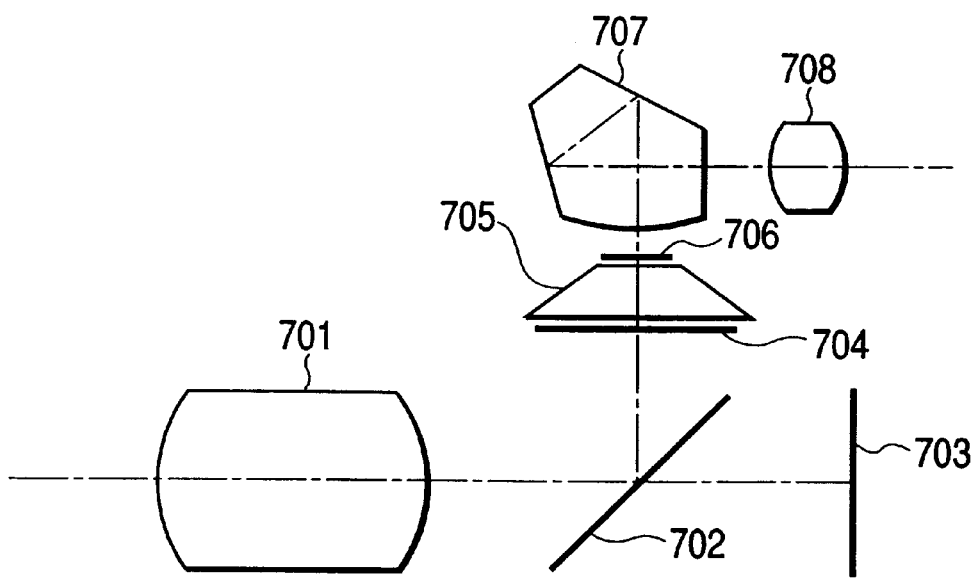
FIG. 7 is a sectional view showing the optical system of a seventh embodiment in the present invention.

FIG. 7 shows the seventh embodiment in which the optical system of the present invention is applied to a TTL type Keplerian real image mode finder for silver halide film cameras. In this figure, reference numeral 701 designates a photographic lens; 702, an instant-return mirror; 703, a film; 704, a first intermediate image formed by the photographic lens 701; 705, an FOP having an entrance end surface and an exit end surface which are different in size and which demagnifies the image; 706, a second intermediate image formed on the exit end surface of the FOP 705; 707, a pentagonal roof prism; and 708, an eyepiece. In this case, the FOP 705 is disposed so that the first intermediate image 704 is formed on the entrance end surface thereof.

The seventh embodiment is constructed as mentioned above, and thus when the instant-return mirror 702, as shown in the figure, is introduced into the optical path, the first intermediate image 704 is formed on the entrance end surface of the FOP 705. The first intermediate image 704 is demagnified by the FOP 705 to the second intermediate image 706, which is observed through the pentagonal roof prism 707 and the eyepiece 708. When the instant-return mirror 702 is swung up and removed from the optical path, an object image formed by the photographic lens 701 falls on the film 703. That is, according to the seventh embodiment, the intermediate image is demagnified by the FOP 705, and hence the pentagonal roof prism 707 and the eyepiece 708 can be downsized. Consequently, the finder optical system can be designed to be compact compared with a conventional finder optical system.

In any of the above embodiments, the magnification of the finder system or the relay system can be arbitrarily chosen by the FOP. Moreover, an optical low-pass filter or an infrared cutoff filter can also be introduced into the optical system when necessary.

What is claimed is:

1. An optical system comprising:

a photographic lens;

a fiber optical plate; and an image pickup member, wherein said photographic lens forms a first image substantially on an entrance end surface of said fiber optical plate, and after said first image is transmitted through said fiber optical plate, a second image is formed substantially on an exit end surface of said fiber optical plate, while said image pickup member is disposed substantially on said second image, and wherein said fiber optical plate magnifies an image transmitted therethrouqh such that said second image is larger than said first image.

2. An optical system comprising a fiber optical plate, wherein said fiber optical plate has an entrance end surface and an exit end surface which are different in size, demagnifies an image transmitted therethrough, and is disposed on an image side of a position where a first intermediate image is formed, and wherein said optical system further comprises a lens disposed on an exit side of said fiber optical plate.

3. An optical system comprising a fiber optical plate, wherein said fiber optical plate magnifies an image transmitted therethrough and is disposed on an image side of a position where a first intermediate image is formed, and wherein said optical system further comprises a lens disposed on an exit side of said fiber optical plate.

4. An optical system comprising:

a first fiber optical plate having an entrance end surface and an exit end surface which are different in size and which demagnifies an image; and a second fiber optical plate having an entrance end surface and an exit end surface which are identical in size and which transmits an image with unity magnification, said first fiber optical plate and said second fiber optical plate being provided to be replaceable on an image side of a position where a first intermediate image is formed.

5. An optical system comprising a fiber optical plate, wherein said fiber optical plate has an entrance end surface and an exit end surface which are different in size, demagnifies an image transmitted therethrough, and is disposed on an image side of a position where a first intermediate image is formed, and wherein said optical system further comprises an eyepiece optical system disposed behind said fiber optical plate.

6. An optical system comprising, in order from an object side:

a first fiber optical plate;

a second fiber optical plate; and an eyepiece optical system, wherein said first fiber optical plate has an entrance end surface and an exit end surface which are different in size, demagnifies an image transmitted therethrough, and is disposed on an image side of a position where a first intermediate image is formed, and wherein said second fiber optical plate magnifies an image transmitted therethrough to form a second intermediate image with a desired size to be observed through said eyepiece optical system.

* * * * *